United States Patent [19]
Izdebski

[11] 3,869,386
[45] Mar. 4, 1975

[54] REMOVAL OF HEAVY METAL IONS FROM PLATING WASTES

[75] Inventor: Wladyslaw Izdebski, San Mateo, Calif.

[73] Assignee: Schlage Lock Company, San Francisco, Calif.

[22] Filed: Oct. 24, 1972

[21] Appl. No.: 300,133

[52] U.S. Cl.................................. 210/53, 134/13
[51] Int. Cl.............................................. C02c 5/02
[58] Field of Search............ 210/50, 53, 42, 51, 52, 210/47, 59, 60; 423/596, 597; 134/13

[56] References Cited
UNITED STATES PATENTS
| | | | |
|---|---|---|---|
| 2,400,272 | 5/1946 | Todd.................................. | 423/596 |
| 3,371,034 | 2/1968 | Richards............................ | 210/51 |
| 3,575,853 | 4/1971 | Gaughan et al................... | 210/50 X |

OTHER PUBLICATIONS
Hoover et al., "Disposal of Waste Liquors from Chromium Plating," Industrial & Engineering Chemistry, Vol. 33, No. 1, January, 1941, pp. 131–134.

*Primary Examiner*—Thomas G. Wyse
*Attorney, Agent, or Firm*—Owen, Wickersham & Erickson

[57] ABSTRACT

Treatment of plating effluents, including at least chromium plating effluent and, in plants having it, zinc plating effluent as well as effluents from plating copper, cadmium, or nickel, removing from these effluents the heavy metal ions. Hexavalent chromium ions are removed directly, without first reducing them to trivalent forms, by adding barium acetate. When other plating effluents are treated, the formed barium compounds are used as a coagulant for their hydroxides, which may be formed by mixing any of these other effluents with the formed barium compound and adjusting the pH to the value enabling precipitation of the hydroxides. Sulfuric acid may be used for this pH adjustment, thereby also precipitating out any remaining barium ions in solution.

14 Claims, 1 Drawing Figure

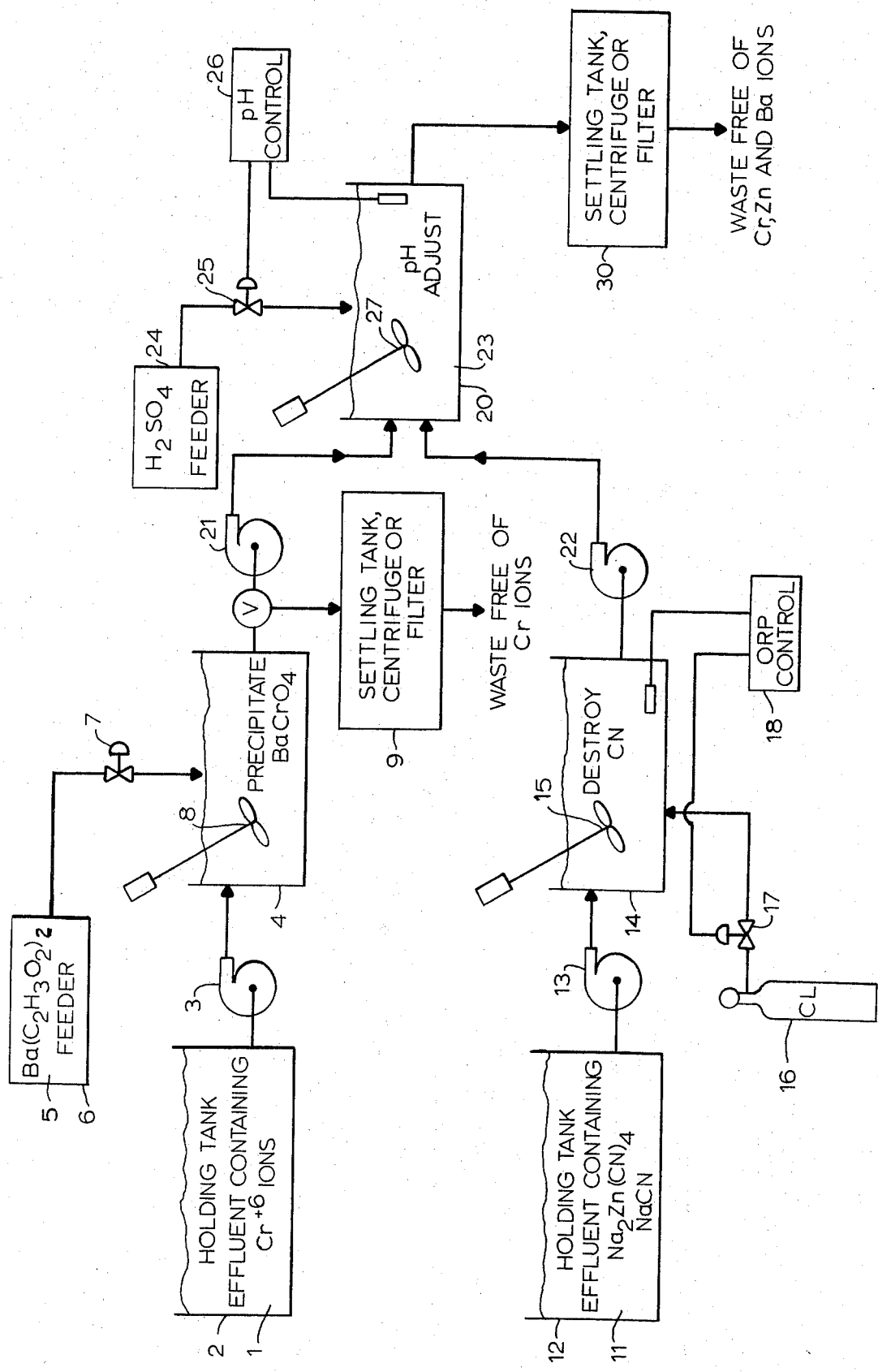

REMOVAL OF HEAVY METAL IONS FROM PLATING WASTES

BACKGROUND OF THE INVENTION

This invention relates to the treatment of wastes from electroplating plants for reducing the amount of pollutants in the effluents and removing the heavy metal ions therefrom.

In recent decades there has been a considerable increase in the volume of industrial effluents being discharged into sewers, resulting in pollution of streams, rivers, lakes, underground waters and oceans. This pollution has made it necessary to place restrictions upon uncontrolled effluent disposal, and at the present time the discharge of industrial effluents is coming under the strict control of local and federal authorities.

Metal-finishing industries have to dispose of dilute effluents containing highly toxic heavy metal ions. Solutions such as electroplating plant effluents containing intolerable quantities of chromium and zinc ions are difficult to dispose of safely.

Presently known methods of removal of these heavy metal ions from plant effluents have been wasteful of land, for they have required large areas for settling tanks or ponds, due to the slow settling rates of the voluminous and gelatinous metal compounds that were precipitated from effluent solutions treated by these prior-art methods.

Other known methods that have been proposed call for expensive proprietary chemicals or expensive proprietary integral process and equipment or both, and some of these methods do not offer complete removal of toxic ions from the treated solutions. Moreover, the commonly known methods have often required a number of consecutive chemical processes in order to obtain the end in view.

For example, effluent containing chromic acid, which is a compound of hexavalent chromium, has commonly been treated first by chemically reducing the hexavalent chromium ions to a trivalent form and then by precipitating the trivalent chromium as chromic hydroxide. However, reduction of hexavalent chromium is efficient and complete only when done at pH 2.0 to 2.5. Hence, the process of reduction has required adjustment of the pH of the collected effluents prior to the reduction process. Various strong reducing agents such as sulfur dioxide, sulfurous acid, sodium sulfite, sodium bisulfite, ferrous sulfate or metallic iron have been used. For example:

$$2CrO_4^{--} + 3SO_3^{--} + 10H^+ \rightarrow 2Cr^{+++} + 3SO_4^{--} + 5H_2O$$

This reaction requires theoretically 96 pounds of sulfur dioxide to reduce 100 pounds of chromic acid. Alternatively, 100 pounds of chromic acid would theoretically require either (1) 156 pounds of sodium bisulfite plus 74 pounds of sulfuric acid, or (2) 190 pounds of sodium sulfite plus 147 pounds of sulfuric acid, or (3) 843 pounds of ferrous sulfate plus 294 pounds of sulfuric acid. So the reduction process of chromic acid to trivalent chromium has required large quantities of reagents and adequate equipment, and has therefore been expensive.

The second step in this prior-art process was the precipitation of trivalent chromium ions as chromic hydroxide:

$$Cr^{+++} + 3OH^- \rightarrow Cr(OH)_3$$

using alkali hydroxides such as sodium hydroxide, sodium carbonate, or calcium hydroxide. The most common practice has been to use sodium hydroxide as the precipitant, but the resultant precipitate is soluble in an excess of the reagent, and precipitation is possible only after hydrolysis accomplished by prolonged boiling with a considerable amount of water; even then precipitation is always incomplete.

This same prior-art process required considerable time and large installations. For this reaction, to treat 100 pounds of chromic acid (after reduction) it has taken 120 pounds of sodium hydroxide or 159 pounds of sodium carbonate, or 111 pounds of calcium hydroxide, to assure perfect stoichiometric reaction. So precipitation, as well as reduction, has also been expensive. Precipitated chromic hydroxide is exceptionally voluminous and has very poor settling properties. Poor coagulation of the precipitate may be improved by adding suitable coagulating agents, such as by adding expensive polyelectrolytes or by adding ferric compounds, which would require additional quantities of precipitant. Thus the process was expensive at every stage.

The effluents from most plating plants also contain zinc ions as a waste from zinc electroplating processes. In the majority of cases, zinc is plated by cyanide zinc plating processes. The effluent from the zinc cyanide process must first be treated to destroy the cyanide ions by oxidizing them to carbon dioxide and nitrogen. The oxidation is carried out at pH 10 to 11.5, in most cases using chlorine as the oxidizing agent. The effluent, once free from cyanides, contains sodium zincate $Na_2ZnO_2$. The conventional method for precipitating zinc from a sodium zincate solution has been by lowering the pH to a value of pH $8.0 \pm 0.2$ in order to precipitate zinc hydroxide. Zinc hydroxide is amphoteric, but within these narrow limits of pH value the precipitation of zinc hydroxide is quantitative:

$$ZnO_2^{--} + 2H^+ \rightarrow Zn(OH)_2$$

The precipitated zinc hydroxide is gelatinous, voluminous, has very poor settling properties, and is difficult to filter.

SUMMARY OF THE INVENTION

In this invention, the effluents from electroplating plants containing chromic acid $Cr^{+6}$ or dichromates $Cr^{+6}$ or mixture of both are precipitated by barium acetate as crystalline barium chromate:

$$CrO_4^{--} + Ba^{++} \rightarrow BaCrO_4$$

or $$Cr_2O_7^{--} + 2Ba^{++} + H_2O \rightarrow 2BaCrO_4 + 2H^+$$

The precipitation is instant, settling is rapid, the precipitate is compact, and if necessary, the precipitate can be readily filtered. $BaCrO_4$ after 15 minutes of settling time is more definitely separated than is $Cr(OH)_3$, yet it occupies only about one-third as much volume as the precipitated $Cr(OH)_3$ after 15 minutes of settling. After a settling time of 1 hour, the volume of precipitated $BaCrO_4$ is about one-seventh the volume of precipitated $Cr(OH)_3$, yet the $BaCrO_4$ is almost completely settled whereas the $Cr(OH)_3$ can stand for weeks without fully settling.

In plants where there is zinc plating, the effluent containing the precipitated barium chromate may be mixed with effluents containing sodium zincate. The mixture of both effluents has a pH of about 11.0. The value of the pH can be adjusted to and maintained at pH $8.0 \pm 0.2$ in order to precipitate the zinc hydroxide.

The settling of the combined precipitates of barium chromate and zinc hydroxide is rapid and is compact. After 1 hour of sedimentation, when its settlement is nearly complete, the volume of the mixed precipitates though further advanced in separation occupy only about 30 percent as much volume as do precipitates of chromic hydroxide and zinc hydroxide after settling for 6 hours. The filtering of the mixed precipitates of barium chromate and zinc hydroxide is easily performed, and the drying time of the sludge is greatly reduced.

BRIEF DESCRIPTION OF THE DRAWING

The drawing is a flow sheet of a method embodying the principles of the invention.

DESCRIPTION OF A PREFERRED EMBODIMENT

The precipitation of chromic acid as barium chromate by various water-soluble barium compounds can be carried out from an alkaline solution of chromic acid but cannot usually be carried out from dichromates unless an alkali acetate is added. Barium acetate is an exception to this rule, for it quantitatively precipitates barium chromate from both chromic acid and dichromates from neutral or slightly acid solutions.

As shown in the drawing, effluent 1 containing hexavalent chromium may be collected in a holding tank 2 where the effluent from chromium plating operations containing dilute chromic acid $Cr^{+6}$ may be combined with dichromates $Cr^{+6}$ from other operations in the plating plant such as chemical conversion coatings, etc. in any combination. The effluent 1 is moved from the tank 2 by a pump 3 to a precipitation tank 4, where a metered amount of barium acetate solution 5 from a tank 6 is added to the chromium plating effluent via a valve 7, which may do the metering. Preferably, the solution in the tank 4 is agitated by a mixer 8. The addition of the barium acetate solution 5 causes a precipitate of barium chromate, acetic acid being the remaining component. Theoretically the barium acetate and chromic acid or dichromate can be completely reacted by calculating the exact amounts, but as a matter of practicality it is normal to add a slight excess of the barium acetate to insure precipitation of all the chromium. The precipitation is instant, and the material rapidly settles.

If desired, this particular precipitation reaction can be completed (see box 9) by simply filtering out or centrifuging out the barium chromate or by letting it settle in a settling tank and then disposing of the remaining solution as by decanting. If an excess of the barium acetate has been used, the filtrate or decanted liquid can then be treated with sulfuric acid or sodium sulfate to precipitate the remaining barium ions so that the effluent will also be free of barium. If settling is used, a retention time of 2 hours is preferably allowed. If the plating plant does not do any zinc plating, this completes the method, and this process has the following advantages over prior methods:

1. Precipitation is much more rapid.
2. The volume of the precipitate is much smaller and more easily filtered or disposed of.
3. Rapid turnover is possible, affording treatment of a large amount of solution in a relatively short time in a relatively small area.
4. No reduction of hexavalent chromium is required.

If the plating plant is one that also does zinc plating, then the solution of sodium zincate as described earlier is now mixed with the solution containing already precipitated barium chromate. Thus, an effluent 11 of sodium zinc cyanide, with free sodium cyanide is collected in a tank 12 and moved by a pump 13 to a treatment vessel 14 having an agitator 15. There, the cyanide ions are destroyed by oxidation, as with chlorine from a vessel 16, fed into the vessel 14 through a valve 17, oxidation-reduction potential being controlled by a suitable well-known control device 18. The effluents from the tanks 4 and 14 are sent to a tank 20 by pumps 21 and 22.

The mixture 23 of these two effluents is then treated with sulfuric acid to adjust the pH of the mixture to pH $8.0 \pm 0.2$ as determined by a pH control device 26. A mixer 27 assures good mixing of the effluent mixture with sulfuric acid introduced from a container 24 via a valve 25. Sulfuric acid has the advantage that there is no need to add any other materials to help precipitate the remaining barium ions that have been added in excess to assure quantitative precipitation of barium chromate. When sulfuric acid is used, it will first precipitate out barium as insoluble barium sulfate, and the remainder of it is used to react with sodium zincate to produce zinc hydroxide:

$$ZnO_2^{--} + 2H^+ \rightarrow Zn(OH)_2$$

At the same time any other metal ions commonly used in electroplating operations and therefore present in plant effluent such as copper, cadmium and nickel can be precipitated out as metal hydroxides:

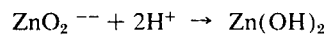
$$Cu^{++} + 2OH^- \rightarrow Cu(OH)_2$$

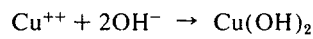
$$Cd^{++} + 2OH^- \rightarrow Cd(OH)_2$$

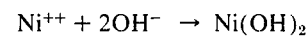
$$Ni^{++} + 2OH^- \rightarrow Ni(OH)_2$$

Effluents containing these metals may be treated along with the zinc cyanide, if they are cyanides, or otherwise may be sent directly to the tank 20. As stated earlier, the settling of the combined precipitates (barium chromate, barium sulfate, zinc hydroxide and all other metal hydroxides) is rapid due to the fact that the barium chromate and barium sulfate act as an excellent coagulant for the metal hydroxides, particularly the most difficult to filter, zinc hydroxide, which is especially voluminous and gelatinous.

Once again the effluent is sent to a separator device 30 such as a settling tank, filter or centrifuge.

A comparison of certain aspects of the present invention with corresponding aspects of the prior art are being set forth in tabular form:

Table 1

Some Comparative Characteristics of Chromium Precipitates

|  | $Cr(OH)_3$ | $BaCrO_4$ |
|---|---|---|
| Structure | amorphous | crystalline |
| Sedimentation — time unit | 7 | 1 |
| Volume unit | 7.5 | 1 |
| Decantation | not practical | convenient |
| Filtration | poor | excellent |
| Filtered sludge drying — time unit | 5 | 1 |

Table 2

Some Comparative Characteristics of Combined Precipitates of Chromium and Zinc

| Structure | $Cr(OH)_3$ and $Zn(OH)_2$ | $BaCrO_4$ and $Zn(OH)_2$ |
|---|---|---|
| Sedimentation — time unit | amorphous — gelatinous | coagulated |
| Volume unit | 5 | 1 |
| Decantation | 3 | 1 |
| Filtration | not practical | convenient |
| Filtered sludge drying — time unit | poor | excellent |
| | 4 | 1 |

The filtrate contains sodium acetate, sodium sulfate and sodium chloride. These materials are acceptable to most sanitary sewer systems.

EXAMPLE 1

A thousand gallons of dilute effluent from the process containing what is considered to be a maximum concentration under normal operating conditions containing an estimated amount of 5 pounds of chromic acid or 600 ppm $CrO_3$ is treated with 60 gallons of water solution containing 12.5 pounds of barium acetate $Ba(C_2H_3O_2)_2 \cdot H_2O$. The material is mixed thoroughly and the precipitate is very rapidly formed. The barium acetate is added in slight excess. To remove the excess barium ions, about one pound of sodium sulfate $Na_2SO_4 \cdot 10H_2O$ is added:

$$Ba^{++} + SO_4^{--} \rightarrow BaSO_4$$

After settling for about 1 hour the contents of the tank are decanted and filtered, and the filtrate containing sodium acetate, and sodium sulfate goes to the sewer. The sludge containing water insoluble barium chromate $BaCrO_4$ and barium sulfate $BaSO_4$ is dried and disposed of as land fill.

EXAMPLE 2

A chromium plating effluent containing chromic acid joined by other streams containing dichromates from other processes and a separate stream carrying wastes from a zinc plating operation is treated as follows:

1,000 Gallons of dilute effluent containing chromic acid and dichromates totaling 600 ppm of hexavalent chromium, calculated as $CrO_3$ in the amount of 5 pounds, is treated with 60 gallons of water containing 12.5 pounds barium acetate. The material is mixed thoroughly and the precipitate of barium chromate is immediately formed. At this point 1,000 gallons of alkaline effluent, containing sodium zincate (after the destruction of cyanides) and having a pH value of about 11.0 and containing a typical maximum of 50 ppm of zinc, is added to the tank which contains the precipitated barium chromate. The pH value of the mixture is adjusted to pH $8.0 \pm 0.2$ by adding approximately 8 pounds of sulfuric acid and is agitated. As stated earlier, the settling of combined precipitates of barium chromate, barium sulfate and zinc hydroxide is rapid, due to the fact that the barium chromate and barium sulfate act as an excellent coagulant for gelatinous and voluminous zinc hydroxide. After settling for 1 hour, the contents of the tank are decanted and filtered. The filtrate containing sodium chloride, sodium sulfate and sodium acetate goes to the sewer. The sludge containing water-insoluble barium chromate, barium sulfate and zinc hydroxide is dried and disposed of as land fill.

EXAMPLE 3

When the plating plant is one that also does cadmium cyanide and copper cyanide plating as well as chromium plating and zinc cyanide plating, the combined dilute wastes from all cyanide processes are treated together by chlorination process in order to destroy cyanides. After destruction of cyanides is accomplished, a thousand gallons of the alkaline effluents, pH about 11.0, containing zinc plus copper (typical average concentration 50 ppm), and cadmium (typical average concentration 50 ppm) were added to the tank which contains the precipitated barium chromate. The pH value of the mixture is adjusted to pH $8.0 \pm 0.2$ by adding approximately 8 pounds of sulfuric acid and is agitated. After settling for 1 hour, the contents of the tank are decanted and filtered. The filtrate containing sodium chloride, sodium sulfate and sodium acetate goes to the sewer. The sludge containing water-insoluble barium chromate, barium sulfate, zinc hydroxide, cadmium hydroxide and copper hydroxide is dried and disposed of as land fill.

EXAMPLE 4

When the plating plant is one that does chromium plating, zinc cyanide plating, cadmium cyanide plating, copper cyanide plating and also nickel plating, then a separate stream of dilute wastes from the nickel plating process is directly added to the tank with precipitated barium chromate. The dilute wastes from the nickel plating have average Ni concentration of 20–100 ppm and the pH value is in the range of pH 6–7. The adjustment of the pH value of the total mixture is exactly the same as described in Example No. 3. After agitation, followed by settling for one hour, the contents of the tank are decanted and filtered. The filtrate containing sodium chloride, sodium sulfate and sodium acetate goes to the sewer. The perfectly coagulated sludge containing water-insoluble barium chromate, barium sulfate, hydroxides of zinc, cadmium and copper and also quantitatively precipitated and water-insoluble nickel hydroxide is dried and disposed of as land fill.

I claim:

1. A process for treating plating plant effluent containing hexavalent chromium ions to remove the chromium ions comprising
    adding thereto barium acetate in an amount sufficient to precipitate substantially all of the hexavalent chromium ions as barium chromate and
    separating the barium chromate precipitate from the solution, to provide a solution from which the chromium ions have been quantitatively removed.
2. The process of claim 1, including
    adding after completing the addition of barium acetate a solution containing a substance chosen from the group consisting of sulfuric acid and water-soluble sulfates in a slight excess, sufficient to precipitate the barium ions, and separating the barium sulfate precipitate from the solution.

3. The process of claim 2, wherein said substance is added before the step separating the barium chromate but after precipitating the barium chromate, and both the barium chromate and barium sulfate are separated simultaneously from the solution.

4. The process of claim 3 wherein the separating is done by settling and decanting.

5. The process of claim 3 wherein the separating step is done by filtration.

6. The process of claim 3, including adding a second plating effluent containing other heavy metal ions after the barium acetate has been added and mixed and before the separating step, and adjusting the pH of the mixture before separation so as to precipitate the hydroxide of the other heavy metal ions, said barium chromate and barium sulfate being used as coagulants to hasten separation of the precipitated hyroxides from the solution.

7. The process of claim 6 wherein said second plating effluent contains at least one metal chosen from the group consisting of zinc, copper, nickel, and cadmium.

8. A process for treating plating plant aqueous effluent containing hexavalent chromium ions as a soluble compound chosen from the group consisting of chromic acid and alkali metal and ammonium bichromates, to remove the chromium ions, comprising sequentially adding thereto an aqueous solution of barium acetate in an amount sufficient to precipitate substantially all of the hexavalent chromium ions as barium chromate, adding thereto in aqueous solution a substance chosen from the group consisting of sulfuric acid and the water-soluble sulfates in an amount sufficient to precipitate all remaining barium ions in solution as barium sulfate, and separating the barium chromate and barium sulfate precipitates from the solution, leaving a solution that can be disposed of more safely than the original said effluent.

9. The process of claim 8, including adding, after the step of adding the barium acetate and before the step of separating, at least one other plating effluent containing metal ions of at least one metal chosen from the groups consisting of zinc, nickel, copper, and cadmium, and adjusting the pH of the resulting mixtures to an amount where the hydroxide of each said metal can precipitate, said barium chromate and barium sulfate serving as coagulants for such hydroxide.

10. A process for treating aqueous plating plant effluents, in which there is a first effluent containing hexavalent chromium ions and a second effluent containing zinc ions that have been converted to sodium zincate, comprising the following steps:

adding a solution of barium acetate to said first effluent in an amount sufficient to precipitate substantially all of the hexavalent chromium ions as barium chromate, mixing the resultant mixtures with said second effluent, adjusting the pH of this mixture of effluents to pH 8, to precipitate zinc hydroxide, said barium chromate acting as a coagulant to hasten coagulation of the zinc hydroxide and separating the precipitates barium chromate and zinc hydroxide from the solution.

11. The process of claim 10, adding after completing addition of the barium acetate a substance chosen from sulfuric acid and the soluble sulfates in aqueous solution, to precipitate any barium ions remaining and in solution, removing the precipitate therefrom.

12. The process of claim 10 wherein said pH is adjusted to pH 8 by sulfuric acid, thereby also precipitating as barium sulfate and barium ions remaining in solution.

13. The process of claim 12, including adding at about the same time as said second effluent a third plating effluent containing at least one soluble salt of at least one metal chosen from the group consisting of copper, cadmium, and nickel.

14. The process of claim 10 wherein the separating comprises settling for at least one hour and then decanting, filtering the decanted liquid.

* * * * *

UNITED STATES PATENT OFFICE
CERTIFICATE OF CORRECTION

PATENT NO. : 3,869,386
DATED : March 4, 1975
INVENTOR(S) : Wladyslaw Izdebski

It is certified that error appears in the above-identified patent and that said Letters Patent are hereby corrected as shown below:

Column 8, line 35, which is line 3 of claim 12,

"and barium ions" should read --any barium ions--.

Signed and sealed this 6th day of May 1975.

(SEAL)
Attest:

RUTH C. MASON
Attesting Officer

C. MARSHALL DANN
Commissioner of Patents
and Trademarks